US012661584B2

(12) United States Patent
Dietrich, Jr.

(10) Patent No.: US 12,661,584 B2
(45) Date of Patent: Jun. 23, 2026

---

(54) HYBRID CLOUD AND LOCAL RENDERING

(71) Applicant: GOOGLE LLC, Mountain View, CA (US)

(72) Inventor: Sim Douglas Dietrich, Jr., Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 141 days.

(21) Appl. No.: 18/562,756

(22) PCT Filed: May 26, 2021

(86) PCT No.: PCT/US2021/034176
§ 371 (c)(1),
(2) Date: Nov. 20, 2023

(87) PCT Pub. No.: WO2022/250662
PCT Pub. Date: Dec. 1, 2022

(65) Prior Publication Data
US 2024/0226729 A1 Jul. 11, 2024

(51) Int. Cl.
*A63F 13/35* (2014.01)
*G06T 7/20* (2017.01)
(Continued)

(52) U.S. Cl.
CPC .............. *A63F 13/35* (2014.09); *G06T 7/20* (2013.01); *G06T 7/40* (2013.01); *G06T 7/70* (2017.01); *A63F 2300/8082* (2013.01)

(58) Field of Classification Search
CPC ..... G06T 7/20; G06T 7/40; G06T 7/70; A63F 13/35; A63F 13/355; A63F 13/67; A63F 2300/8082
See application file for complete search history.

(56) References Cited

U.S. PATENT DOCUMENTS 8,698,813 B2 * 4/2014 Iwasaki ................... A63F 13/35
345/501
10,092,834 B2 10/2018 Georgiev et al.
(Continued)

FOREIGN PATENT DOCUMENTS

WO 2012107739 A2 8/2012
WO 2018047168 A1 3/2018

OTHER PUBLICATIONS

International Preliminary Report on Patentability mailed Dec. 7, 2023 for PCT Application No. PCT/US2021/034176, 10 pages.
(Continued)

*Primary Examiner* — Ming Wu

(57) ABSTRACT

Information is received by one or more servers regarding a plurality of components of a virtual environment to be presented for display by a remote client device. A set of remote rendering prioritization values, indicating a degree of prioritization for rendering individual components of the plurality of components by the one or more server computing devices, is determined based on the received information. Based on the set of remote rendering prioritization values, a partial scene of the virtual environment is generated at the one or more servers by rendering a set of first components of the plurality of components. The generated partial scene of the virtual environment is transmitted to the remote client device for compositing with a set of second components of the plurality of components to be rendered by the remote client device.

23 Claims, 5 Drawing Sheets

(51) Int. Cl.
  G06T 7/40      (2017.01)
  G06T 7/70      (2017.01)

(56)                References Cited

U.S. PATENT DOCUMENTS

|  |  |  |  |
|---|---|---|---|
| 10,902,043 B2 * | 1/2021 | Cremer | G06F 16/35 |
| 2009/0278842 A1 * | 11/2009 | Peterfreund | H04N 19/124 |
|  |  |  | 345/419 |
| 2014/0375634 A1 | 12/2014 | Hillesland et al. |  |
| 2017/0287097 A1 | 10/2017 | Chen |  |
| 2018/0310113 A1 * | 10/2018 | Ray | G09B 21/003 |
| 2020/0327740 A1 | 10/2020 | Frommhold et al. |  |

OTHER PUBLICATIONS

International Search Report and Written Opinion mailed May 26, 2021 for PCT Application No. PCT/US2021/034176, 15 pages.
Tewari, A. et al.; "State of the Art on Neural Rendering" Eurographics, 2020, vol. 39, No. 2, 27 pages.
Communication under Rule 71(3) EPC mailed Jan. 7, 2026 for EP Application No. 21734259.1, 39 pages.

* cited by examiner

HYBRID CLOUD AND LOCAL RENDERING

CROSS-REFERENCE TO RELATED APPLICATIONS

The present application is a U.S. National Stage under 35 U.S.C. § 371 of International Patent Application Serial No. PCT/2021/034176, entitled "HYBRID CLOUD AND LOCAL RENDERING" and filed on May 26, 2021, the entirety of which is incorporated by reference herein.

BACKGROUND

"Cloud gaming" or "game streaming" typically involves executing a video game application on one or more remote servers and providing the resulting video and audio content as a video stream and audio stream, respectively, that is transmitted over one or more networks to a user's client device. By utilizing at least one remote server (i.e., "the cloud") to perform some or all aspects of the associated tasks of graphics rendering, video capture, video encoding, and video streaming, a user may run performance-taxing game applications without using a high-end hardware client device. Instead, the user may typically need only a display screen, a device capable of playing a video stream, and one or more user input devices. Similarly, virtual reality (VR) and augmented reality (AR) systems typically utilize one or more high-performance servers (whether local or remote with respect to a user of such systems) to graphically render a virtual environment that is then transmitted to a client device via one or more networks.

Various rendering tasks are associated with large computational and bandwidth needs, such as may be available using one or more graphics processing units in a server network or data center. However, certain applications may require that a higher priority be placed on low latency and high responsiveness, as with VR and AR applications. In such applications, high latency may result in "rendering lag," and even lead to user motion sickness or other negative effects on a user.

BRIEF SUMMARY OF EMBODIMENTS

Embodiments are described herein in which information is received by one or more servers regarding a plurality of components of a virtual environment to be presented for display by a remote client device. A set of remote rendering prioritization values, indicating a degree of prioritization for rendering individual components of the plurality of components by the one or more server computing devices, is determined based on the received information. Based on the set of remote rendering prioritization values, a partial scene of the virtual environment is generated at the one or more servers by rendering a set of first components of the plurality of components. The generated partial scene of the virtual environment is transmitted to the remote client device for compositing with a set of second components of the plurality of components to be rendered by the remote client device.

In certain embodiments, a server-implemented method may comprise receiving, by one or more server computing devices, information regarding a plurality of components of a virtual environment to be presented for display by a remote client device; determining, at the one or more server computing devices and based at least in part on the received information, a set of remote rendering prioritization values indicating a degree of prioritization for rendering individual components of the plurality of components by the one or more server computing devices; generating, at the one or more server computing devices and based at least in part on the set of remote rendering prioritization values, a partial scene of the virtual environment by rendering a set of first components of the plurality of components; and transmitting, by the server device, information representing the generated partial scene of the virtual environment for compositing with a set of second components of the plurality of components to be rendered by the remote client device.

The method may further comprise transmitting at least some of the remote rendering prioritization values to the remote client device for use in rendering the set of second components.

The method may further comprise receiving the information regarding the plurality of components includes receiving the information from the remote client device.

Receiving the information regarding the plurality of components may include receiving the information from a gaming application executed by at least one of the one or more server computing devices.

Rendering the set of first components of the plurality of components at the one or more server computing devices may include rendering by the one or more server computing devices a first portion of the virtual environment, with a remainder of the virtual environment to be rendered by the remote client device.

The method may further include formatting the information representing the generated partial scene to a format compatible with a software application executed by the client device for processing and display of the virtual environment.

The set of first components to be rendered by the one or more server computing devices may be defined by at least one environment rendering threshold.

The method may further comprise determining the set of first components by identifying each component for which a remote rendering prioritization value assigned to the component exceeds the at least one environment rendering threshold.

Determining the set of remote rendering prioritization values may include determining the set of remote rendering prioritization values based at least in part on network conditions for one or more networks communicatively coupled to at least one of the one or more server computing devices.

The method may further include determining the environment rendering threshold based at least in part on the network conditions.

Determining the set of remote rendering prioritization values may include determining the set of remote rendering prioritization values based at least in part on a spatial proximity between a virtual viewing location in the virtual environment and one or more components of the plurality of components.

Determining the set of remote rendering prioritization values may include determining the set of remote rendering prioritization values based at least in part on a degree of complexity associated with one or more components of the plurality of components.

Determining the set of remote rendering prioritization values may include determining the set of remote rendering prioritization values based at least in part on a degree of recent motion associated with at least one of the plurality of components in the virtual environment.

Determining the set of remote rendering prioritization values may include determining the set of remote rendering prioritization values based at least in part on a degree of predicted motion associated with at least one of the plurality of components in the virtual environment.

Determining the set of remote rendering prioritization values may include determining the set of remote rendering prioritization values based at least in part on an analysis of one or more components of multiple prior virtual environments.

The information regarding the plurality of components may include one or more members of a group that includes 3D model information for one or more objects within the virtual environment, pose information for one or more objects within the virtual environment, material information for one or more objects within the virtual environment, and texture information for one or more objects within the virtual environment.

The information regarding the plurality of components may include an identifier for each of at least one object within the virtual environment, such that the identifier is included in an object database of the one or more server computing devices.

In certain embodiments, a server may comprise a network interface, one or more processors, and a memory storing a set of executable instructions. The set of executable instructions, when executed by the one or more processors, may manipulate the one or more processors to receive information regarding a plurality of components of a virtual environment to be presented for display by a remote client device; to determine, based at least in part on the received information, a set of remote rendering prioritization values for the virtual environment indicating a degree of prioritization for rendering individual components of the plurality of components by the one or more server computing devices; to generate, based at least in part on the set of remote rendering prioritization values, a partial scene of the virtual environment by rendering a set of first components of the plurality of components; and to transmit information representing the generated partial scene of the virtual environment for compositing with a set of second components of the plurality of components to be rendered by the remote client device.

The set of executable instructions may further manipulate the one or more processors to transmit at least some of the remote rendering prioritization values to the remote client device for use in rendering the set of second components.

The information regarding the plurality of components may be received from the remote client device.

The information regarding the plurality of components may be received from a gaming application executed by at least one of the one or more server computing devices.

The set of remote rendering prioritization values may be based on one or more members of a group that includes network conditions for one or more networks communicatively coupled to at least one of the one or more server computing devices; a spatial proximity between a virtual viewing location in the virtual environment and one or more components of the plurality of components; a degree of complexity associated with one or more components of the plurality of components; a degree of recent motion associated with at least one of the plurality of components in the virtual environment; a degree of predicted motion associated with at least one of the plurality of components in the virtual environment; and an analysis of one or more components of multiple prior virtual environments.

The information regarding the plurality of components includes one or more members of a group that includes 3D model information for one or more objects within the virtual environment, pose information for one or more objects within the virtual environment, material information for one or more objects within the virtual environment, and texture information for one or more objects within the virtual environment.

The information regarding the plurality of components includes an identifier for each of at least one object within the virtual environment, the identifier being included in an object database of the one or more server computing devices.

In certain embodiments, a computer-implemented method may include providing, by a client computing device and to one or more server computing devices, information regarding a plurality of components of a virtual environment to be presented for display; receiving, by the client computing device from the one or more server computing devices and based at least in part on the provided information, a partial rendering of the virtual environment, the partial rendering including a set of rendered first components of the plurality of components; rendering, by the client computing device, a set of second components of the plurality of components; and displaying the virtual environment to a user, such that displaying the virtual environment user includes compositing the set of rendered first components with the set of rendered second components.

The method may further include receiving, responsive to the provided information regarding the plurality of components, an indication of one or more remote rendering prioritization values delineating the set of second components of the plurality of components.

Providing the information regarding the plurality of components may include generating the information via a gaming application executed by the client computing device.

The set of second components may be determined based on one or more members of a group that includes network conditions for one or more networks communicatively coupled to the client computing device; a spatial proximity between a virtual viewing location in the virtual environment and one or more components of the plurality of components; a degree of complexity associated with one or more components of the plurality of components; a degree of recent motion associated with at least one of the plurality of components in the virtual environment; a degree of predicted motion associated with at least one of the plurality of components in the virtual environment; and an analysis of one or more components of multiple prior virtual environments.

The information regarding the plurality of components may include one or more members of a group that includes 3D model information for one or more objects within the virtual environment, pose information for one or more objects within the virtual environment, material information for one or more objects within the virtual environment, and texture information for one or more objects within the virtual environment.

The information regarding the plurality of components may include an identifier for each of at least one object within the virtual environment, the identifier being included in an object database of the one or more server computing devices.

In certain embodiments, a non-transitory computer-readable medium may store a set of executable instructions to manipulate at least one processor to perform any of the methods described above.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Techniques described herein address competing demands for graphical realism in the rendering of a virtual environment versus the responsiveness to do so during user operations that include moving through that virtual environment. In particular, such techniques allow partial simulation and rendering of a virtual environment to be performed by one or more server computing devices associated with high computational bandwidth (but that are remotely located from a user and therefore subject to relatively high latency and/or low responsiveness), and the remainder of such simulation and rendering of the virtual environment to be performed by a client device with less computational bandwidth but with relatively low latency and higher responsiveness with respect to that user. Thus, the competing demands for responsiveness and graphical detail can be addressed by selectively rendering a first portion of a scene depicting a virtual environment on one or more server computing devices and a second portion of the scene on a client device, which then composites the first and second portions of the scene for display to a user. Compositing the first and second portions of the scene relates to combining or merging the first and second portions which originate from different sources (e.g., the remote one or more servers as one source, and the client device as another distinct source) into a single image so that the respective first and second portions are displayed to a user as parts of the same scene. Thus, the proposed solution relates to a hybrid rendering of a virtual environment using cloud and local computing devices for rendering components of the virtual environment.

Figure 1:
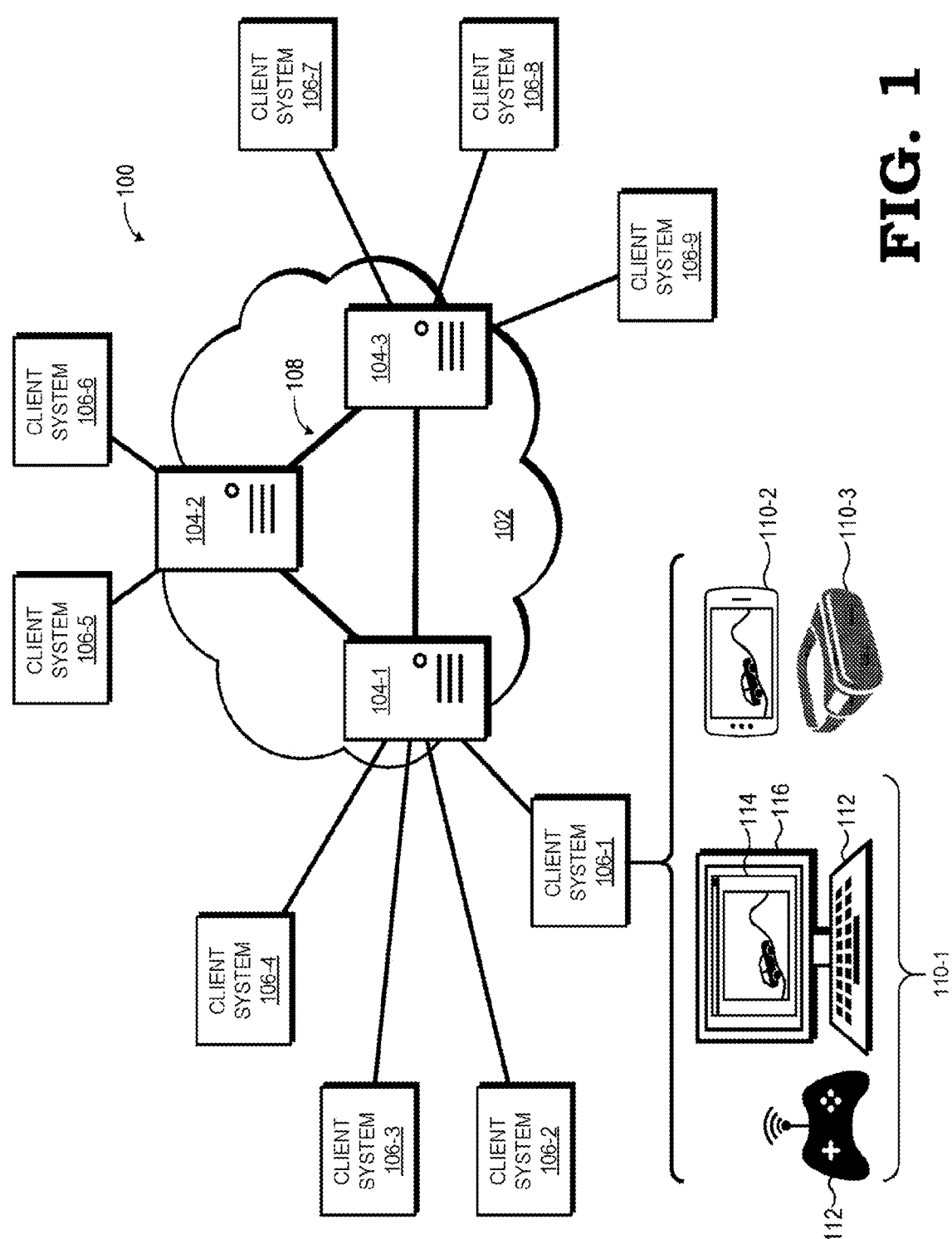
FIG. 1 is a block diagram illustrating a cloud gaming system facilitating single- and multi-player gaming in accordance with one or more embodiments.

FIG. 1 is a block diagram illustrating a cloud gaming system 100 facilitating single-player and/or multiplayer (including massively multiplayer) gaming in accordance with at least one embodiment. The cloud gaming system 100 includes a cloud platform 102 having a plurality of server computing devices (servers) 104 that are coupled to corresponding subsets of a plurality of client systems 106 via one or more networks, such as the Internet. The servers 104 are interconnected in the depicted embodiment via a high-bandwidth, low-latency inter-server messaging bus 108. The servers 104 typically are distributed in one or more data centers over a geographical area so as to reduce transmission latency through physical proximity. In the simplified example of FIG. 1, the cloud platform 102 includes three servers 104-1 to 104-3 supporting nine client systems 106-1 to 106-9, with client systems 106-1 to 106-4 served by server 104-1, client systems 106-5 and 106-6 served by server 104-2, and client systems 106-7 to 106-8 served by server 104-3. It will be appreciated that in a typical real-world implementation, the quantity of servers 104 and quantity of client systems 106 typically will be considerably higher.

In the depicted embodiment of FIG. 1, each server 104 operates to execute a corresponding game platform instance that facilitates execution of one or more game sessions of a gaming application for a corresponding player. That is, the game platform instance provides various resources, such as communication/network management, resource management, media rendering encoding, and the like, so as to simulate execution of a gaming application for a corresponding player as though that gaming application was being played on a local gaming device, such as a personal computer (PC) or game console. Each player game session thus represents execution, or simulation, of the gaming application for a corresponding player.

Each client system 106 represents the hardware and software resources utilized to receive player input through manipulation of one or more input/output devices for at least one player, as well as to present the video and audio content representing the visual and auditory content, respectively, of the gameplay for the at least one player. Examples of a client system 106 include one or more desktop computers, notebook computers, tablet computers, virtual-reality system, augmented reality system, a compute-enabled cellular phone (that is, a "smart phone"), a compute-enabled television (that is, a "smart TV"), and the like. As illustrated with reference to client system 106-1, each client system 106 includes one or more client devices 110. In the depicted embodiment, the client system 106-1 comprises a first client device 110-1, which is communicatively coupled to, or otherwise associated with, a display 116, at least one input device 112, one or more network interfaces to couple to the network connecting the client system 106 to the corresponding server 104, one or more processors, memory, storage, speakers, and other computing resources to render, process, and display scenes of a virtual environment. The client system 106-1 further comprises a smart phone client device 110-2, and a wearable virtual reality client device 110-3, each of which may operate as an integrated mobile computing device having input facilities, output facilities, display facilities, and communication facilities analogous to those noted above with respect to the client device 110-1. In certain embodiments, client devices 110-2 and 110-3 may include one or more facilities such as accelerometers, Global Positioning System (GPS) devices, and the like that are used to acquire motion data representing movement of the client device, as well as a rate or acceleration of such movement.

While certain aspects of embodiments described herein will be discussed with specific reference to cloud gaming scenarios, it will be appreciated that in certain embodiments the described techniques may be utilized in various non-gaming scenarios, such as if one or more of servers 104 and client systems 106 operate to render, process, and display other types of informational, educational, recreational and/or artistic content. It will therefore be further appreciated that while techniques are discussed herein with respect to the rendering of content that may utilize particular examples relevant to cloud gaming and gaming content, such discussions and techniques may be applied to such non-gaming scenarios. Examples provided herein may refer to scenarios involving the rendering, processing, and display of gaming content due to particular bandwidth and network latency issues relevant to such content, and should not be construed to indicate that the techniques described are limited to those scenarios.

During operation, the client system 106 receives from a corresponding server 104 information representing a rendered first set of components of a virtual environment (not shown) generated from execution of a corresponding player game session, and utilizes the compute, storage, and display resources of the client device 110 to locally render a second set of components of the virtual environment, composite the first set of rendered components and the rendered second set of components to generate a scene of the virtual environment, and display the resulting composited scene for a user. In some embodiments, the processing and display of such scenes is facilitated by a software application executed by the first and/or second gaming client devices at the client system 106 (and represented in FIG. 1 by graphical user interface (GUI) 114). This software application can include, for example, a cloud-gaming-specific software application. In other embodiments, a more general software application is utilized, and the rendered graphical information is formatted and transmitted by the server 104 to be compatible with this software application. For example, in one embodiment the client system 106 utilizes a web browser that utilizes a hypertext markup language (HTML) format for compositing and display of the server-rendered components.

The presentation of the virtual environment on a display of the client device 110 is affected by changes to the user's virtual viewing location and orientation (also termed virtual viewpoint) within the virtual environment. For example, in certain scenarios a background image representative of distant objects in the scene may remain relatively static regardless of the user's traversal of the virtual environment. Being interactive, the executing player game session utilizes player input to at least partially direct the gameplay experience of a gaming session with the player, including translational and angular movement (pitch, yaw, etc.) through the virtual environment. With respect to client device 110-1, this player input is received at least in part through the input device 112, which comprises any of a variety of I/O devices or a combination thereof, such as a game controller, game pad, joystick, keyboard, mouse, touchpad, touchscreen, trackball, steering wheel or yoke, pedal, dance pad, simulated gun, optical motion tracker, inertial sensor, light/laser source and detector, and the like. In some embodiments, the input device 112 is communicatively coupled to one or more of the associated gaming client devices, such that player input data generated by a player's manipulation of the input device 112 is provided to the corresponding server 104 via the client system 106. To illustrate, in certain embodiments the input device 112 can be wired or wirelessly connected to the client system 106 such that all data output by the input device 112 is routed through a network interface between the client system 106 and the network connecting the client system 106 to the server 104. In other embodiments, the input device 112 has a separate, independent network connection with the corresponding server 104 via a network. For example, the cloud gaming system 100 could employ a wireless local area network (WLAN) access point (not shown) local to the client system 106 and the input device 112 and connected to the Internet, and wherein each of the client system 106 and the input device 112 establishes a separate wireless connection with the WLAN access point to independently communicate with the corresponding server 104 over the Internet via the WLAN access point. With respect to client devices 110-2 and 110-3, similar operations may utilize integrated facilities of the client device to relay one or more aspects of a user's input to the server 104.

As used herein, "latency" refers to time that elapses between user input and changes in the presentation of a virtual environment that are responsive to that user input. Typically, a user is more sensitive to such latency with respect to the motion of or changes to objects appearing closer to the user's virtual viewpoint in the virtual environment. Therefore, one objective of rendering the virtual environment is to ensure low latency with respect to the motion and rendering of those objects having a high degree of proximity to the user's virtual viewpoint. In contrast, the motion of or changes to objects in the virtual environment that are further from the virtual viewpoint may be less noticeable by the user than such changes to objects that are in closer proximity to the virtual viewpoint. The discernible effects of the user's movement through the virtual environment may therefore be mitigated by selectively partitioning the rendering process of various components, e.g., objects, in the virtual environment between the remote server computing device and the local client computing device. Dividing the rendering of a scene between locally rendered components and remotely rendered components can balance the competing demands for low latency, a strong sense of immersion, and high viewing quality.

The server 104 and client device 110 may exchange various types of information as part of rendering a virtual scene. As non-limiting examples, such information may include reference information, such as coordinate and/or alignment information, which may be used to align a first set of components of the virtual environment that are rendered by the server 104 with a second set of components rendered by the client device; object model information related to such components; and rendered graphics that represent the components rendered by the host processing system based on a set of remote rendering prioritization values determined by the server. The client device composites the locally rendered components with the rendered components provided by the server computing system, such as based on the coordinate/alignment information to create a scene to be displayed parts of which are formed by the locally and remotely rendered components.

Figure 2:
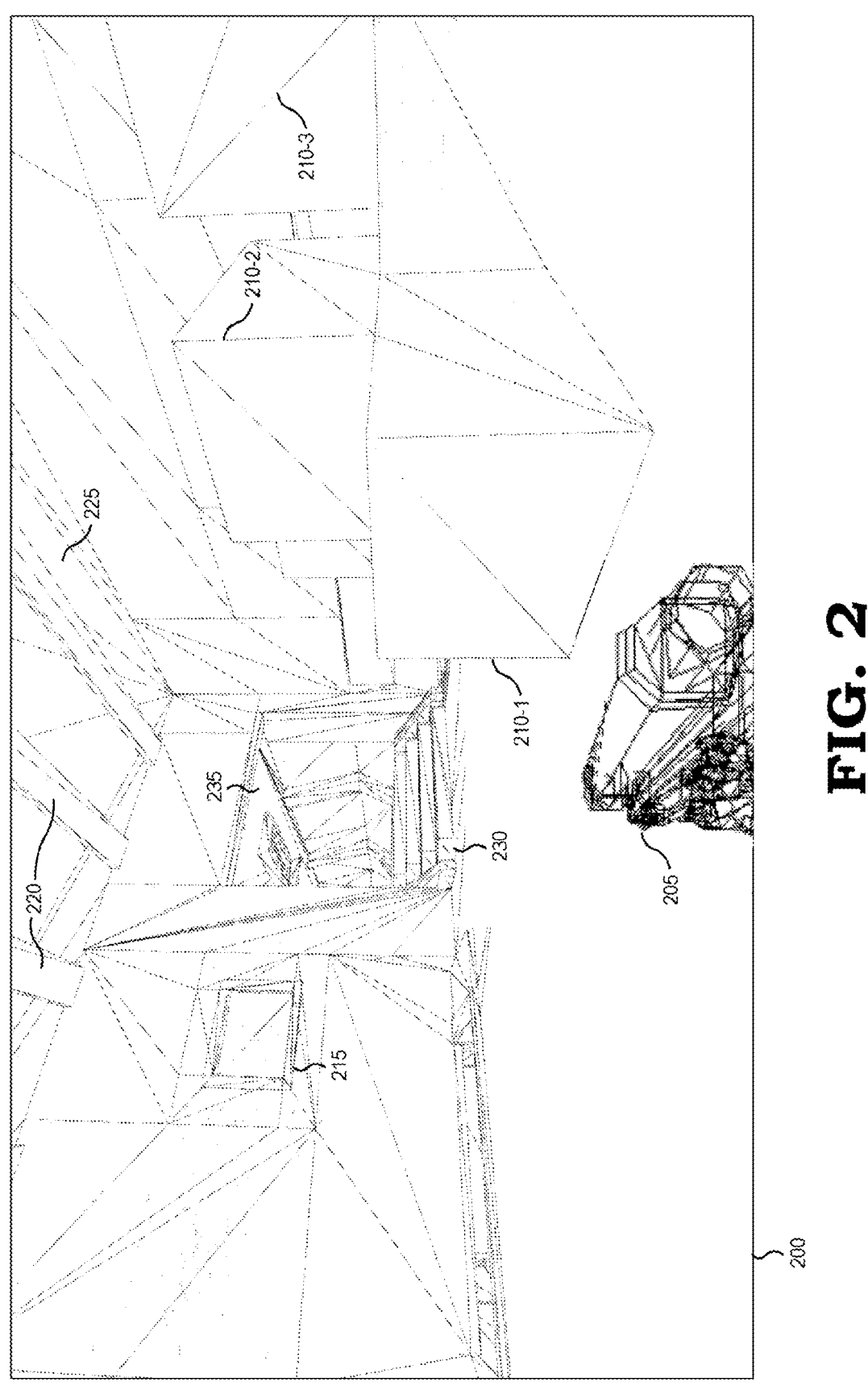
FIG. 2 illustrates an example scene depicting a wireframe representation of a virtual environment to be rendered in accordance with one or more embodiments.

FIG. 2 illustrates an example scene depicting a wireframe representation of gameplay within a three-dimensional (3D) virtual environment 200, to be rendered (whether locally, remotely, or some combination thereof) for display by a client device in accordance with one or more embodiments. In the depicted embodiment, the virtual environment 200 includes a variety of objects of varying complexities and varying degree of proximity to a gaming user's virtual viewpoint (e.g., the coordinates and orientation from which the user views the virtual environment, used interchangeably herein with "virtual viewing location") within that virtual environment. In particular, the virtual environment 200 includes a first-person weapon object 205, having relatively high complexity and very high degree of proximity to the user's virtual viewpoint; several box objects 210 (indicated individually as box objects 210-1, 210-2, and 210-3), each having a low degree of complexity and a relatively high degree of proximity to the virtual viewpoint; a virtual display object 215, having a relatively low degree of complexity and low degree of proximity to the virtual viewpoint; a small set of stairs 230 leading to a small exit room 235, each having a relatively high degree of complexity and a low degree of proximity to the virtual viewpoint; and a collection of ceiling beam objects 220 placed against a virtual room ceiling 245, each having a low degree of complexity and a low degree of proximity to the virtual viewpoint.

In certain embodiments, the server computing device may be communicatively coupled to an object database containing a set of unique identifiers that are each associated with information representing one or more components of a two- or three-dimensional object, such as may be stored by the server computing device when first rendering the object, and which may be retrieved for faster rendering when the server computing device identifies that the object has previously been rendered.

During operations, one or more remote server computing devices (described in this example as "remote" based on being removed from the local user by one or more intervening networks, cables, or other transmission media) receives information regarding the components of the virtual environment 200 that are to be presented for display by a local client device. For purposes of the example scene of FIG. 2, assume that the virtual environment is provided for rendering as part of executing a gaming application, either by the one or more server computing devices (such as servers 104 of FIG. 1) or by a client computing device (such as client device 110 of FIG. 1) that is communicatively coupled to the server computing device. In either case, the server computing device receives information regarding the components of the objects within the virtual environment 200. While this continuing example shall reference a single server for purposes of brevity, it will be understood that in various scenarios and embodiments such server may comprise one or more server computing devices, operating individually or in combination.

Each of the listed objects within the virtual environment 200 may comprise multiple components. As non-limiting examples, an object in the virtual environment may include one or more model components, each describing one or more surface geometries and/or coordinate maps (e.g., as a collection of points in a two-dimensional or three-dimensional space); pose information describing location, position, and/or orientation associated with at least a portion of the object; one or more material components, each describing one or more aspects of a virtual material (e.g., stone, metal, glass, etc.) comprising at least a portion of the object; one or more texture components, each describing one or more aspects of a surface or surfaces of the object; and one or more lighting components, each describing a lighting effect to be rendered in association with the object. For example, the box object 210-1 may include a model component describing its physical geometry and location in the virtual environment 200; one or more material components to describe some or all surfaces of the box object; and one or more texture components to describe such surfaces.

In response to receiving the information regarding the components of the virtual environment 200, the server determines a set of remote rendering prioritization values corresponding to components in the virtual environment, e.g., individual objects or portions thereof. The set of remote rendering prioritization values indicate a degree of prioritization for rendering individual components of the plurality of components by the one or more server computing devices. In various embodiments and scenarios, the server may determine the set of remote rendering prioritization values based on various criteria. As non-limiting examples, the server computing device(s) may determine the set of remote rendering prioritization values based on one or more of the following: network conditions for one or more networks communicatively coupled between the server and the client device, such as a degree of network latency, network bandwidth, or other network condition; a spatial proximity between the user's virtual viewpoint in the virtual environment 200 and one or more components in the virtual environment; a degree of complexity associated with one or more components in the virtual environment; a degree of recent motion (such as within a defined number of seconds immediately prior to the associated request to render the scene) or predicted motion (such as within a defined number of seconds immediately following the request to render the scene) associated with one or more objects and/or components in the virtual environment; and an analysis of one or more components that have been previously rendered by the server computing device(s), either in the current virtual environment 200 or in one or more prior virtual environments, such as if an object has been previously stored in an object database of the server.

Figure 3:
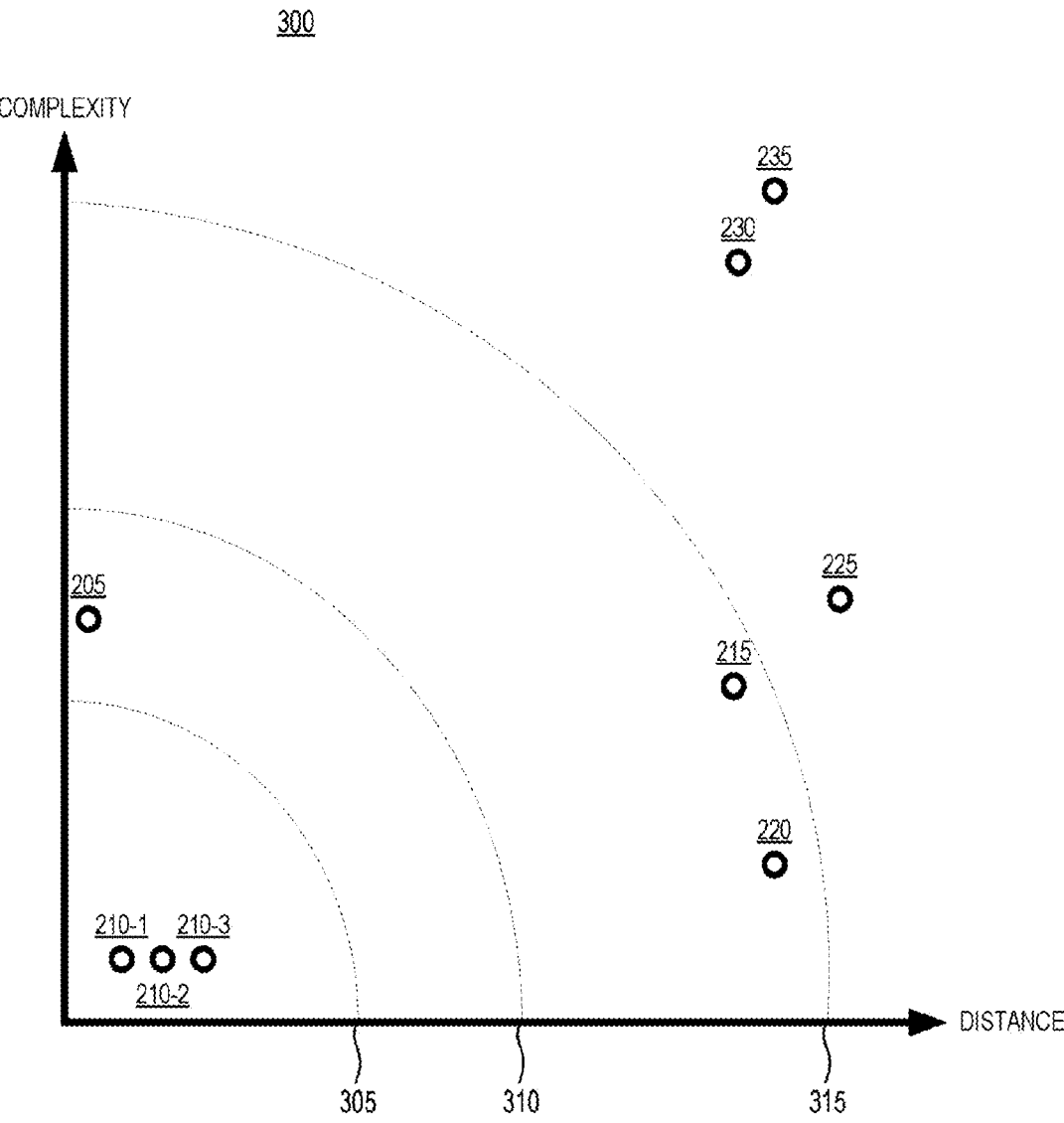
FIG. 3 depicts simplified remote rendering prioritization values for objects within a virtual environment based on their relative complexity and proximity to the virtual viewpoint of a user within the virtual environment.

FIG. 3 depicts a simplified relative remote rendering prioritization graph 300 for the objects within the virtual environment 200 of FIG. 2 based on their relative complexity and proximity to the virtual viewpoint of the user within that virtual environment. As used herein, complexity of an object may refer to a quantity of components associated with an object (e.g., surfaces, texture maps, bump maps, lighting maps, specular components, etc.). In addition, an individual component may be associated with a relative degree of complexity based on (as non-limiting examples) a quantity of coordinate points, triangles, curves, splines, or other primitives associated with the component. Thus, a relative degree of complexity associated with an object may reflect an assessed totality of its individual components.

As noted elsewhere herein, the remote rendering prioritization values assigned to components within the virtual environment 200 indicate a degree of prioritization for rendering those components by the server. Moreover, FIG. 3 further depicts distinct environment rendering thresholds for those objects, as represented by environment rendering thresholds 305, 310, and 315. It will be appreciated that for purposes of simplicity, each of the objects within the virtual environment is placed on the remote rendering prioritization graph 300 as a whole, rather than representing each component of those objects separately. In actual operation, the server may, for example, determine to render one or more components of an object remotely, while the client may render specular or other view-dependent effects on the surface of those components before compositing the remotely rendered components with the locally rendered components to generate and display the full scene for the user.

In various embodiments, the environment rendering threshold may be determined based on various criteria, including one or more display latency goals (e.g., target latency thresholds, target average latency thresholds, etc.) one or more network conditions for one or more networks communicatively coupled between the server and the local client device. In certain embodiments, the environment rendering threshold may be determined as a threshold for assigned remote rendering prioritization values, such that objects assigned a remote rendering prioritization value that meets or exceeds the environment rendering threshold are rendered by the server, with objects assigned a remote rendering prioritization value below the environment rendering threshold being rendered by the local client device.

In the embodiment of FIG. 3, each of the environment rendering thresholds 305, 310, and 315 represents overall network conditions (including latency, bandwidth, etc.) indicative of whether rendering for a particular object is to be performed by the remote server or the local client device.

In particular, the server may determine to render components of objects located external to a given environment rendering threshold on the remote rendering prioritization graph 300, with the client device rendering components of objects located within that same environment rendering threshold.

For example, environment rendering threshold 305 represents relatively favorable network conditions, such that the remote server may render all of the enumerated objects within the virtual environment 200 other than box objects 210, each of which is associated with a low degree of complexity (being comprised of relatively few surfaces, textures, etc.) and a relatively high degree of proximity to the virtual viewpoint of the user. Environment rendering threshold 310 represents moderate network conditions, such that the local client device renders both the box objects 210 and the first-person weapon object 205, while the remote server renders the virtual display object 215, ceiling beam objects 220, virtual room ceiling 225, stairs 230, and the exit room 235. Environment rendering threshold 315 represents relatively poor network conditions, such that the local client device is to render all of the enumerated objects within the virtual environment 200 other than the virtual room ceiling 225, stairs 230, and exit room 235. In various embodiments and scenarios, the server may dynamically adjust the environment rendering threshold to accommodate shifting network conditions in order to satisfy one or more display latency goals (e.g., maintaining a display latency below 100 ms, an average display latency below 80 ms, and/or other defined metric). It will be appreciated that although the environment rendering thresholds 305, 310, and 315 are depicted here as arcs having substantially identical curvature and appearance other than radius, the server may utilize various dynamic environment rendering thresholds to accomplish such goals, such as based on a relative computational bandwidth of the client device, dynamic latency goals based on a type of gaming application output or other application output being rendered, or other criteria.

In certain embodiments, after determining the set of remote rendering prioritization values for components of the virtual environment 200, the server may generate a partial scene of the virtual environment by rendering a set of first components and transmitting the rendered set of first components to the client device, such as for compositing with a set of second components of the virtual environment that are rendered by the client device itself. The client device then presents the composited scene of the virtual environment to the user via a display that is either coupled to (as with client device 110-1 of FIG. 1) or integrated within (as with client devices 110-2 or 110-3 of FIG. 1) the client device.

Figure 4:
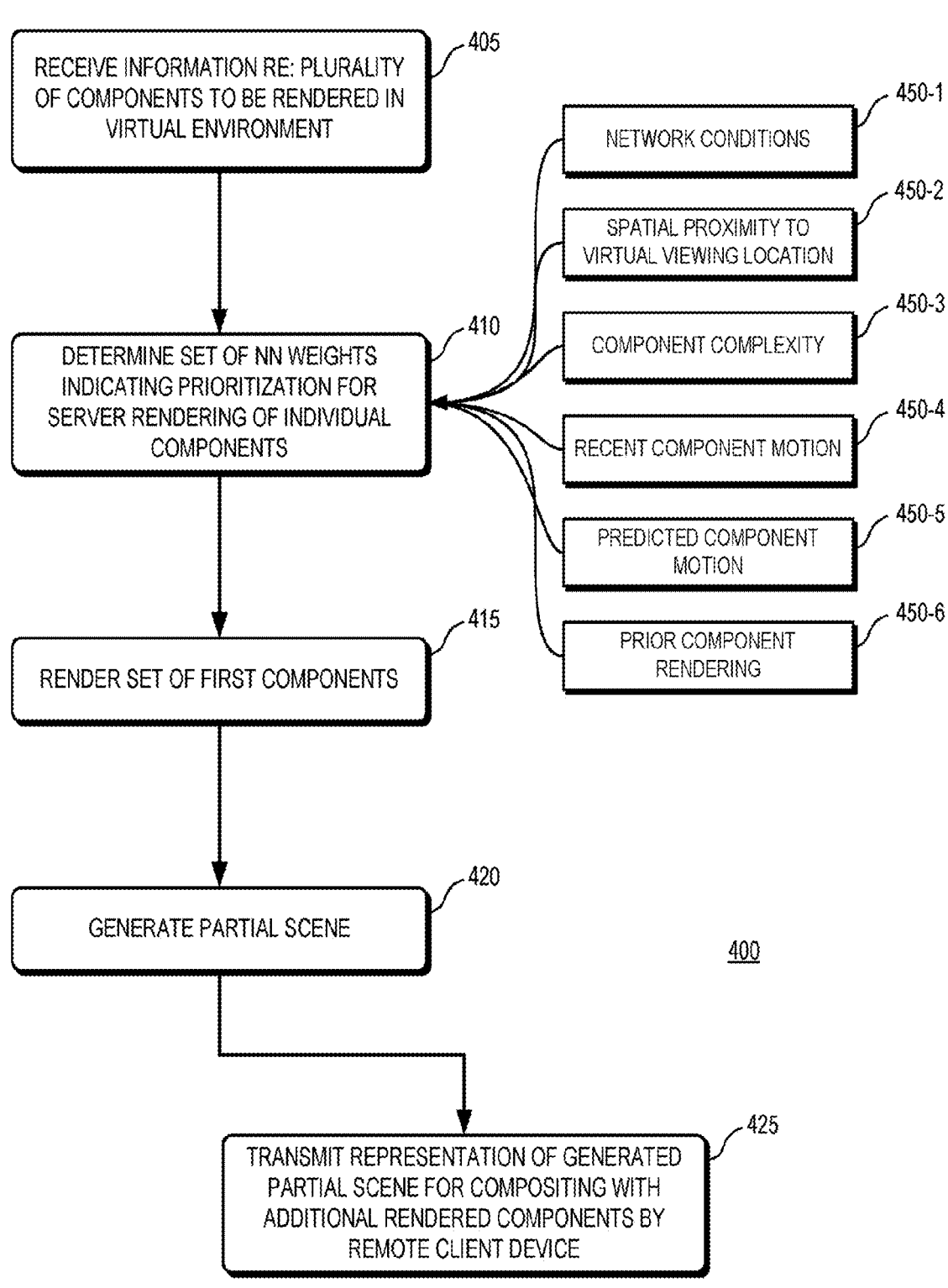
FIG. 4 is a block diagram illustrating an overview of an operational routine of a processor-based server system in accordance with one or more embodiments.

FIG. 4 is a block diagram illustrating an overview of an operational routine of a processor-based server system in accordance with one or more embodiments. The routine may be performed, for example, by one or more of the servers 104 of FIG. 1, by cloud gaming server computing system 500 of FIG. 5, or by some other embodiment.

The routine begins at block 405, in which the processor-based server system receives information regarding a plurality of components of a virtual environment to be rendered for display to a user of a remote client computing device. The remote client computing device, for example, may be one of client computing devices 110 of FIG. 1. The routine then proceeds to block 410.

At block 410, the processor-based server system determines a set of remote rendering prioritization values indicating prioritization for graphical rendering of the individual components in the virtual environment to be performed by the processor-based server system. In various embodiments, determination of the set of remote rendering prioritization values may be based on one or more of criteria 450. In the depicted embodiment, criteria 450 include network conditions criterion 450-1, indicating conditions for one or more networks communicatively coupled to the processor-based server system (such as may indicate parameters related to bandwidth, latency, etc.); spatial proximity criterion 450-2, indicating a spatial proximity between a virtual viewpoint in the virtual environment and one or more components in the virtual environment; component complexity criterion 450-3, indicating a degree of complexity associated with one or more components in the virtual environment; recent motion criterion 450-4, indicating a degree of recent motion associated with one or more components in the virtual environment; predicted motion criterion 450-5, indicating a degree of predicted motion associated with one or more components of the virtual environment; and prior environment criterion 450-6, based on an analysis of identical or similar components that have been rendered wholly or in part by the processor-based server system, either in the current virtual environment or one or more prior virtual environments. As one example, the processor-based server system may assign remote rendering prioritization values in a specified range (e.g. from 0.001 to 1.000) to each object in the virtual environment, with higher values indicating a greater likelihood that the server system is to render that object in the graphical environment while still complying with one or more defined environment rendering thresholds (e.g., latency requirements, average latency requirements, rendering quality requirements, etc.). It will be appreciated that any system of assigning such remote rendering prioritization values may be utilized without diverging from the scope of the intended embodiments.

After determining the set of remote rendering prioritization values based on criteria 450 and the received information regarding the plurality of components to be rendered in the current virtual environment, the routine proceeds to block 415.

At block 415, the processor-based server system renders a set of first components, with such first components being prioritized for rendering by the processor-based server system as a result of the determined set of remote rendering prioritization values. For example, with continued reference to the example above, the server system may determine to render all objects associated with a remote rendering prioritization value greater than 0.43 in order to comport with one or more defined environment rendering thresholds, such as to ensure that the latency between a user moving in the virtual environment and seeing the result of that movement never exceeds 100 ms. After the set of first components has been rendered by the processor-based server system, the routine proceeds to block 420.

At block 420, the processor-based server system generates a partial scene of the virtual environment based on its rendering of the set of first components; at block 425, the processor-based server system transmits information representing the partial scene to the remote client device for compositing with the remaining components in the virtual environment once those remaining components are rendered by the remote client device. In certain embodiments, the processor-based server system may omit generation of the partial scene, such as in embodiments or scenarios in which the set of first rendered components is provided to the remote client device with information (e.g., coordinate mapping information) allowing the remote client device to independently align the set of first rendered components within the virtual environment.

Figure 5:
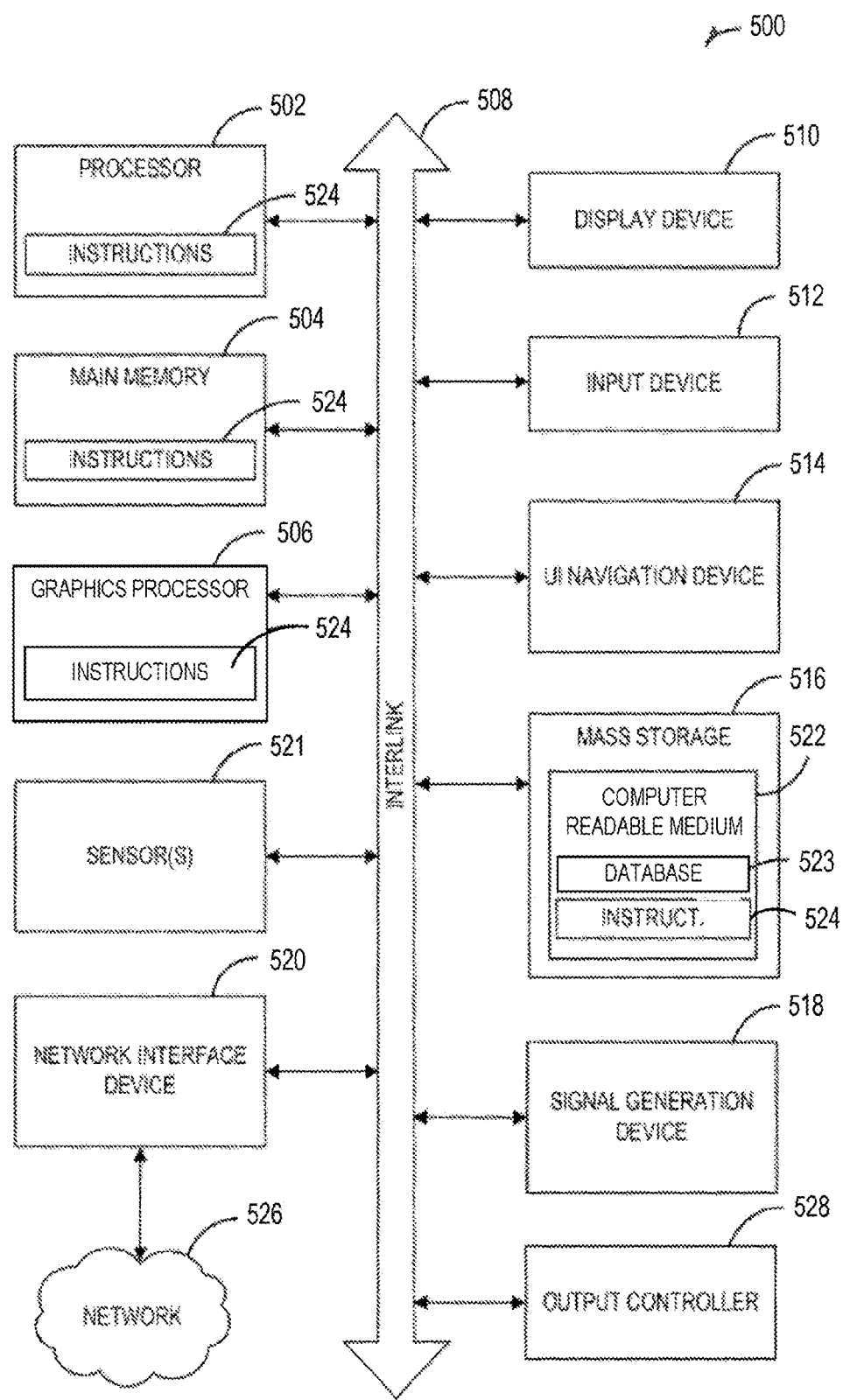
FIG. 5 is a component-level block diagram illustrating an example server computing system configured for executing techniques described herein in accordance with one or more embodiments.

FIG. 5 is a component-level block diagram illustrating an example of a computing system 500 suitable for implementing one or more embodiments. In alternative embodiments, the computing system 500 may operate as a standalone device or may be connected (e.g., networked) to other systems. In various embodiments, one or more components of the computing system 500 may be incorporated as or within one or more server computing systems to provide various types of rendered content in accordance with techniques described herein. It will be appreciated that an associated server computing device may include some components of computing system 500, but not necessarily all of them. In a networked deployment, the computing system 500 may operate in the capacity of a server machine, a client machine, or both in server-client network environments. In at least one example, the computing system 500 may act as a peer system in peer-to-peer (P2P) (or other distributed) network environment. The computing system 500 may be a server computer, a personal computer (PC), a tablet PC, a set-top box (STB), a mobile computing device, a web appliance, a network router, switch or bridge, or any system capable of executing instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The computing system 500 may include one or more hardware processors 502 (e.g., a central processing unit (CPU), a hardware processor core, or any combination thereof), a main memory 504, and a graphics processing unit (GPU) 506, some or all of which may communicate with each other via an interlink (e.g., bus) 508. The computing system 500 may further include a display unit 510 (such as a display monitor or other display device), an alphanumeric input device 512 (e.g., a keyboard or other physical or touch-based actuators), and a user interface (UI) navigation device 514 (e.g., a mouse or other pointing device, such as a touch-based interface). In one example, the display unit 510, input device 512, and UI navigation device 514 may comprise a touch screen display. The computing system 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing system 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a computer readable medium 522 on which is stored one or more sets of data structures 523 (e.g., database) or instructions 524 (e.g., software) embodying or utilized by any one or more of the techniques or functions described herein. The instructions 524 may also reside, completely or at least partially, within the main memory 504, within GPU 506, or within the hardware processor 502 during execution thereof by the computing system 500. In an example, one or any combination of the hardware processor 502, the main memory 504, the GPU 506, or the storage device 516 may constitute computer readable media.

While the computer readable medium 522 is illustrated as a single medium, the term "computer readable medium" may include a single medium or multiple media (e.g., a centralized or distributed database, and/or associated caches and servers) configured to store the one or more instructions 524.

The term "computer readable medium" may include any medium that is capable of storing, encoding, or carrying instructions for execution by the computing system 500 and that cause the computing system 500 to perform any one or more of the techniques of the present disclosure, or that is capable of storing, encoding or carrying data structures used by or associated with such instructions. Non-limiting computer readable medium examples may include solid-state memories, and optical and magnetic media. In an example, a massed computer readable medium comprises a computer readable medium with a plurality of particles having invariant (e.g., rest) mass. Accordingly, massed computer readable media are not transitory propagating signals. Specific examples of massed computer readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the computing system 500, and includes digital or analog communications signals or other intangible medium to facilitate communication of such software.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A server-implemented method, comprising:

generating, at one or more server computing devices and based at least in part on information regarding a plurality of components of a virtual environment to be presented for display by a remote client device, a set of remote rendering prioritization values indicating a degree of priority for rendering the plurality of components;

based at least in part on the set of remote rendering prioritization values, selecting a first subset of components of the plurality of components for rendering by the one or more server computing devices;

generating, via one or more neural networks, a partial scene of the virtual environment by rendering at the one or more server computing devices the selected first subset of components; and transmitting, by the one or more server computing devices, information representing the generated partial scene for compositing with a second subset of components of the plurality of components to be rendered by the remote client device.

2. The server-implemented method of claim 1, further comprising transmitting at least some of the remote rendering prioritization values to the remote client device for use in rendering the second subset of components.

3. The server-implemented method of claim 1, further comprising receiving the information regarding the plurality of components from the remote client device.

4. The server-implemented method of claim 1, further comprising receiving the information regarding the plurality of components from a gaming application executed by at least one of the one or more server computing devices.

5. The server-implemented method of claim 1, wherein rendering the first subset of components at the one or more server computing devices includes rendering by the one or more server computing devices a first portion of the virtual environment, with a remainder of the virtual environment to be rendered by the remote client device.

6. The server-implemented method of claim 1, further comprising formatting the information representing the generated partial scene to a format compatible with a software application executed by the remote client device for processing and display of the virtual environment.

7. The server-implemented method of claim 1, wherein the first subset of components is defined by at least one environment rendering threshold.

8. The server-implemented method of claim 7, wherein selecting the first subset of components comprises identifying each component for which a remote rendering prioritization value assigned to the component exceeds the at least one environment rendering threshold.

9. The server-implemented method of claim 7, wherein generating the set of remote rendering prioritization values comprises determining the set of remote rendering prioritization values based at least in part on network conditions for one or more networks communicatively coupled to at least one of the one or more server computing devices.

10. The server-implemented method of claim 9, further comprising determining the environment rendering threshold based at least in part on the network conditions.

11. The server-implemented method of claim 1, wherein generating the set of remote rendering prioritization values comprises generating the set of remote rendering prioritization values based at least in part on a spatial proximity between a virtual viewing location in the virtual environment and one or more components of the plurality of components.

12. The server-implemented method of claim 1, wherein generating the set of remote rendering prioritization values comprises generating the set of remote rendering prioritization values based at least in part on a degree of complexity associated with one or more components of the plurality of components.

13. The server-implemented method of claim 1, wherein generating the set of remote rendering prioritization values comprises generating the set of remote rendering prioritization values based at least in part on a degree of recent motion associated with at least one of the plurality of components in the virtual environment.

14. The server-implemented method of claim 1, wherein generating the set of remote rendering prioritization values comprises generating the set of remote rendering prioritization values based at least in part on a degree of predicted motion associated with at least one of the plurality of components in the virtual environment.

15. The server-implemented method of claim 1, wherein generating the set of remote rendering prioritization values comprises generating the set of remote rendering prioritization values based at least in part on an analysis of one or more components of multiple prior virtual environments.

16. The server-implemented method of claim 1, wherein the information regarding the plurality of components includes one or more members of a group that includes 3D model information for one or more objects within the virtual environment, pose information for one or more objects within the virtual environment, material information for one or more objects within the virtual environment, and texture information for one or more objects within the virtual environment.

17. The server-implemented method of claim 1, wherein the information regarding the plurality of components includes an identifier for each of at least one object within the virtual environment, the identifier being included in an object database of the one or more server computing devices.

18. A server, comprising:
a network interface;
one or more processors; and a memory storing a set of executable instructions, the set of executable instructions to manipulate the one or more processors to:
  generate, based at least in part on information regarding a plurality of components of a virtual environment to be presented for display by a remote client device, a set of remote rendering prioritization values indicating a degree of priority for rendering the plurality of components;
  based at least in part on the set of remote rendering prioritization values, select a first subset of components of the plurality of components for rendering by the one or more processors;
  generate, via one or more neural networks, a partial scene of the virtual environment by rendering the selected first subset of components; and
  transmit information representing the generated partial scene for compositing with a second subset of components of the plurality of components to be rendered by the remote client device.

19. The server of claim 18, wherein the set of executable instructions is further to manipulate the one or more processors to transmit at least some of the remote rendering prioritization values to the remote client device for use in rendering the second subset of components.

20. The server of claim 18, wherein the set of executable instructions is further to manipulate the one or more processors to receive the information regarding the plurality of components from the remote client device.

21. The server of any of claim 18, wherein the set of executable instructions is further to manipulate the one or more processors to receive the information regarding the plurality of components from a gaming application executed by at least one of the one or more server computing devices.

22. The server of any of claim 18, wherein the set of remote rendering prioritization values is based on one or more members of a group that includes:
  network conditions for one or more networks communicatively coupled to at least one of the one or more server computing devices;
  a spatial proximity between a virtual viewing location in the virtual environment and one or more components of the plurality of components;
  a degree of complexity associated with one or more components of the plurality of components;
  a degree of recent motion associated with at least one of the plurality of components in the virtual environment;
  a degree of predicted motion associated with at least one of the plurality of components in the virtual environment; and
  an analysis of one or more components of multiple prior virtual environments.

23. A computer-implemented method, comprising:
  providing, by a client computing device and to one or more server computing devices, information regarding a plurality of components of a virtual environment to be presented for display;
  receiving, by the client computing device from the one or more server computing devices and based at least in part on the provided information, a partial rendering of the virtual environment that includes a first subset of components of the plurality of components, the first subset of components having been rendered by at least one of the one or more server computing devices via one or more neural networks based at least in part on a set of remote rendering prioritization values indicating a degree of priority for rendering the plurality of components;

rendering, by the client computing device, a second subset of components of the plurality of components; and displaying, by the client computing device, the virtual environment to a user, wherein displaying the virtual environment to the user includes compositing the first rendered subset of components with the second rendered subset of components.

* * * * *